United States Patent [19]

Foreman et al.

[11] Patent Number: 5,127,773
[45] Date of Patent: Jul. 7, 1992

[54] CARRIER DELIVERY TERMINAL FOR A PNEUMATIC TRANSPORT SYSTEM

[75] Inventors: Michael J. Foreman, Carrollton; Harold R. Greene, Farmers Branch, both of Tex.

[73] Assignee: Comco Systems, Dallas, Tex.

[21] Appl. No.: 647,427

[22] Filed: Jan. 28, 1991

[51] Int. Cl.⁵ ............................................. B65G 51/30
[52] U.S. Cl. ..................................... 406/179; 406/83; 406/84; 406/112
[58] Field of Search ................. 406/112, 176, 179, 83, 406/84

[56] References Cited

U.S. PATENT DOCUMENTS

| | | | |
|---|---|---|---|
| 570,161 | 10/1896 | Fordyce | 406/179 X |
| 891,144 | 6/1908 | Burton | 406/179 |
| 3,237,881 | 3/1966 | Grosswiller, Jr. et al. | 406/84 X |
| 3,298,632 | 1/1967 | Carson | 406/176 X |
| 3,830,446 | 8/1974 | Rudder et al. | 406/176 X |
| 4,189,261 | 2/1980 | Kelley et al. | 406/112 |

FOREIGN PATENT DOCUMENTS

| | | | |
|---|---|---|---|
| 2458297 | 6/1976 | Fed. Rep. of Germany | 406/179 |
| 2812238 | 10/1978 | Fed. Rep. of Germany | 406/179 |

Primary Examiner—Margaret A. Focarino
Assistant Examiner—Andrew C. Pike
Attorney, Agent, or Firm—Richards, Medlock & Andrews

[57] ABSTRACT

A pneumatic transport system includes a pneumatic transport tube having a stop device mounted therein. A window aperture is defined through a wall of the transport tube such that a pneumatic tube carrier is presented for retrieval through the window aperture upon its arrival. A pneumatic pressure source is provided to cause the carrier to move through the transport tube.

11 Claims, 2 Drawing Sheets

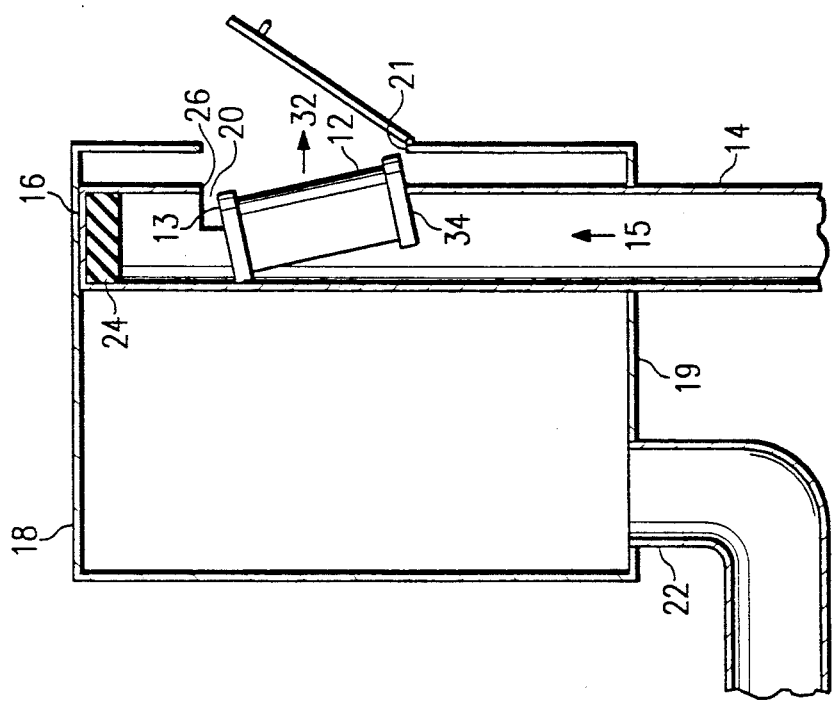
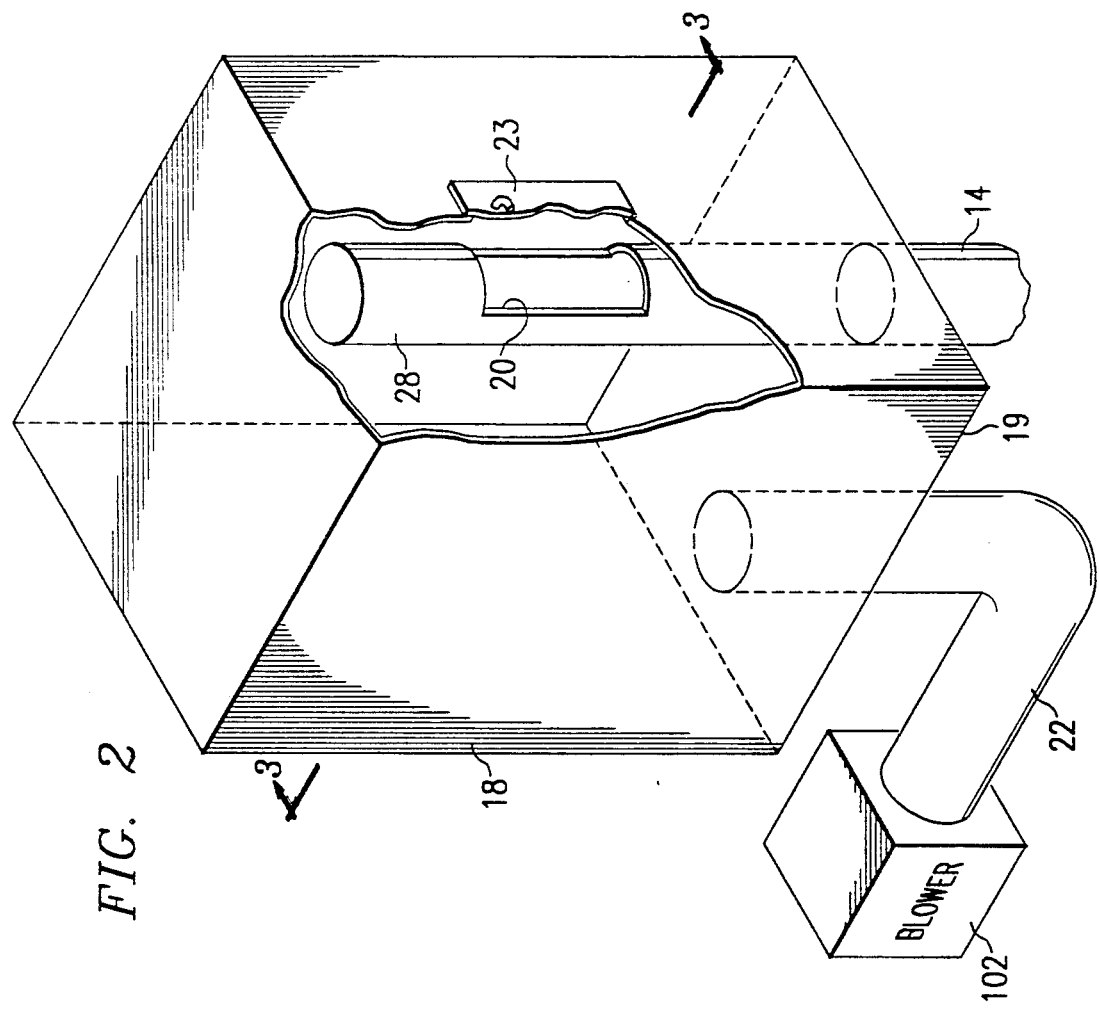

CARRIER DELIVERY TERMINAL FOR A PNEUMATIC TRANSPORT SYSTEM

TECHNICAL FIELD OF THE INVENTION

This invention relates to a terminal for receiving a carrier traveling in a pneumatic transport tube and for presenting the carrier for easy removal from the tube without the use of a mechanical or electrical catch device.

BACKGROUND OF THE INVENTION

Pneumatic transport systems are widely known and used to transport articles from one location to another. Pneumatic transport or delivery systems commonly consist of tubes or conduits through which a carrier travels by means of pneumatic pressure. The pneumatic pressure may be provided by a blower, a pressurizer, or a vacuum source. Perhaps the most common use of pneumatic transport systems is in drive-in bank teller systems where banking business is conducted by a carrier transported between the bank and a remote drive-in teller terminal. Other uses for pneumatic transport systems include the moving of documents between floors in a building or from office to office. Pneumatic transport systems that are capable of operating at slower speeds may be used in transporting blood samples and other "fragile" cargo.

In previous pneumatic transport systems, it has been necessary to employ a mechanical catch device for the purpose of holding the carrier in a desired position upon its arrival at a terminal. This situation is particularly evident where the carrier is traveling upwardly as it enters the terminal in which case gravity will cause the carrier to exit the terminal and re-enter the transport tube. An example of a pneumatic transport system utilizing a mechanical catch device is set forth in U.S Pat. No. 4,971,481 filed Feb. 10, 1989, "Pneumatic Tube Stop Device and Terminal."

The present invention provides a pneumatic transport terminal capable of receiving and retaining a carrier without the need for a mechanical catch apparatus.

SUMMARY OF THE INVENTION

The present invention provides a pneumatic transport terminal for receiving a carrier which has been propelled through a pneumatic tube by a stream of air and for presenting the carrier for easy retrieval. The pneumatic tube is closed on one end. A window aperture dimensioned to permit the carrier to be passed therethrough is formed in the tube proximal the closed end of the pneumatic tube. A carrier stop is disposed at the closed end of the tube in order to halt the forward motion of the carrier. As the carrier reaches the terminal, a portion of the carrier is forced from the tube as a result of compressed air exiting the tube through the window aperture.

BRIEF DESCRIPTION OF THE DRAWINGS

For a more complete understanding of the present invention and the advantages thereof, reference is made to the following description of the accompanying drawings, in which:

FIG. 2 shows a cutaway view of a preferred embodiment of the pneumatic transport system terminal of the present invention;

FIG. 3 shows a cross-sectional view taken along section plane 3—3—3—3 in FIG. 2 in of the terminal in accordance with the preferred embodiment of the present invention depicted in FIG. 2.

DETAILED DESCRIPTION

Figure 1:
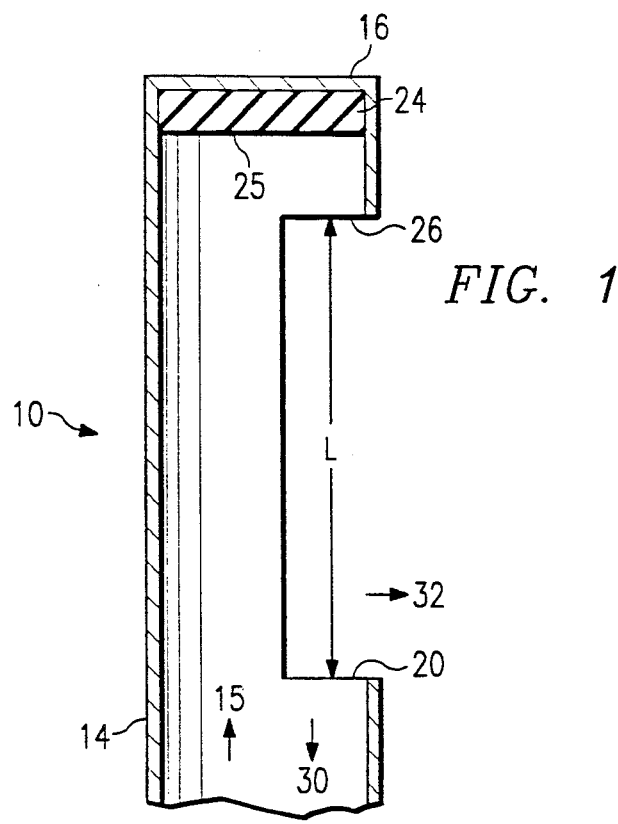
FIG. 1 shows a cross-sectional view taken along section plane 1—1—1—1 in FIG. 4 of a pneumatic transport system terminal in accordance with the present invention.
Figure 4:
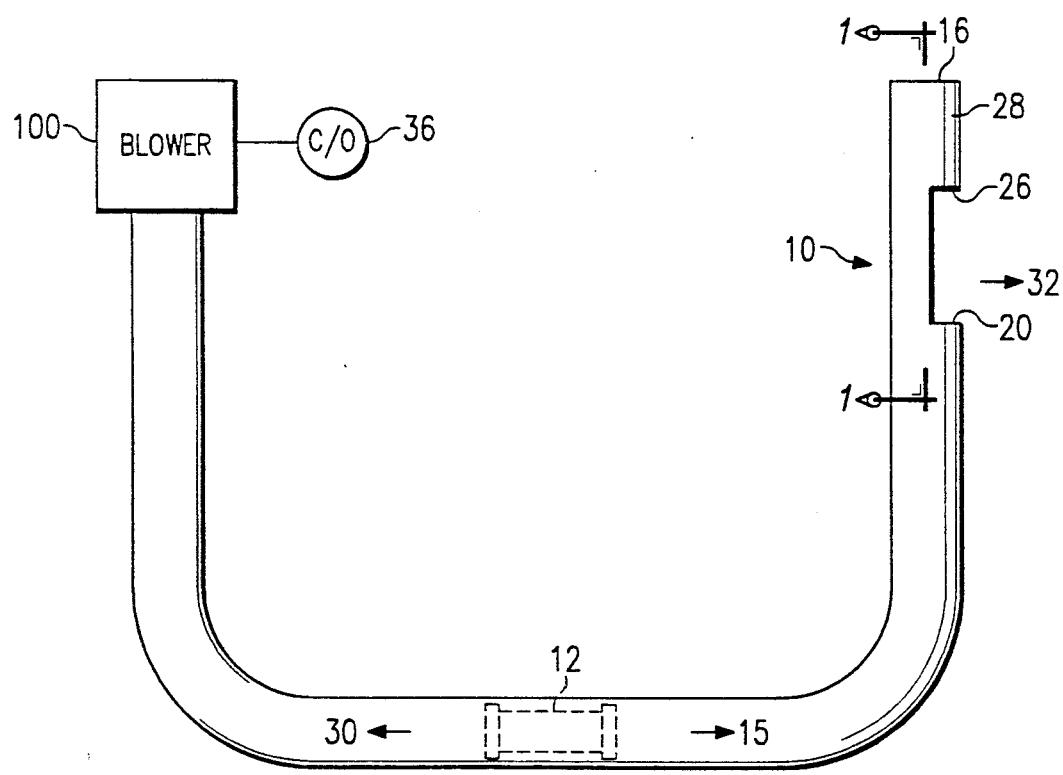
FIG. 4 shows a plan view of the pneumatic transport system terminal of the present invention connected to a pneumatic transport system.

A pneumatic transport system terminal constructed in accordance with the present invention is generally identified by reference numeral 10. Carrier 12 can be transported through pneumatic tube 14 via air or vacuum pressure toward terminal 10. Pneumatic pressure source 100 is provided to pneumatically force carrier 12 through tube 14 in direction 15. In those embodiments in which carrier 12 is to be transported through tube 14 in two directions, pneumatic pressure source 100 is preferably a two-way blower, i.e., is able to create a flow of air through tube 14 in either direction. Alternatively, second pneumatic pressure source 102 can be provided for the purpose of forcing carrier 12 from terminal 10 to a remote terminal. Pneumatic pressure source 102 is discussed in greater detail below.

Tube 14 is closed at its terminal end 16. A window aperture 20 is formed in tube 14 proximal terminal end 16. Window aperture 20 is sufficiently dimensioned to permit removal of carrier 12 from tube 14. Length "L" of window aperture 20 is preferably at least as long as the length of carrier 12 in order to facilitate retrieval and replacement of carrier 12.

In a preferred embodiment of the present invention depicted in FIGS. 2 and 3, end 16 and window aperture 20 are disposed within containment chamber 18. In this preferred embodiment, tube 14 passes through wall 19 of containment chamber 18 and terminates within containment chamber 18 at end 16. In this embodiment, containment chamber 18 includes an exhaust aperture 22 and a carrier retrieval aperture 21. Retrieval aperture 21 is preferably aligned with window aperture 20 to permit carrier 12 to be removed from tube 14 through aperture 21 and window aperture 20. In one embodiment, carrier retrieval aperture door 23 is provided over aperture 21 in order to isolate the interior of containment chamber 18 from its external environment. Exhaust aperture 22 allows the internal environment of containment chamber 18 to communicate with the external environment of containment chamber 18.

In one embodiment of the present invention, stop device 24 is disposed within transport tube 14 at terminal end 16. Stop device 24 is constructed to halt the movement of carrier 12 in direction 15 within tube 14. Stop device 24 preferably includes an impact pad 25 positioned to absorb the impact between carrier 12 and terminal end 16. Pad 25 is preferably constructed of an elastomeric material in order to reduce damage to carrier 12 upon its impact with stop device 24.

In an alternative embodiment of the present invention depicted in FIGS. 2 and 3, distal edge 26 of window aperture 20 is spaced from terminal end 16 to form a pneumatic air cushion space 28. In this embodiment, air is trapped within air cushion space 28 as the leading surface 13 of carrier 12 passes distal edge 26. As carrier 12 continues in direction 15, the air pressure within air cushion space 28 will increase due to compression, causing carrier 12 to decelerate and stop. The magnitude of the deceleration is dependent upon the dimensions of the pneumatic system and the carrier, the weight of the carrier and its contents, and the fit between the carrier and the tube. Standard bank carriers have been stopped in approximately three inches (3") from speeds as high as 20 ft./sec. using this air cushion technique. In a preferred embodiment, air cushion space 28 has a length of approximately one to one and one-half times the diameter of tube 14 in order to provide an adequate stopping distance for carrier 12.

Carrier 12 will tend to rebound in direction 30 after it has been stopped by stop device 24 or by air cushion space 28. As carrier 12 rebounds, compressed air continues to flow through tube 14 in direction 15, thereby dampening the rebound of carrier 12. Depending upon the original speed of carrier 12 and the pressure with which compressed air source 100 forces carrier 12 through tube 14, carrier 12 will oscillate briefly adjacent window aperture 20 before reaching an equilibrium point. As carrier 12 reaches its equilibrium point, air continues to flow through tube 14 in direction 15. This stream of air exits tube 14 window aperture 20, thereby creating an outward force on carrier 12 in the direction generally indicated by arrow 32. Due to this force, trailing surface 34 of carrier 12 is forced outwardly through window aperture 20, causing carrier to become at least partially dislodged from tube 14 as depicted in FIG. 3. The resulting displacement of carrier 12 from tube 14 obviates the need for a mechanical catch mechanism because carrier 12 will remain in the position depicted in FIG. 3 until it is repositioned by the operator.

An airflow cutoff 36 can be provided to stop the stream of air from compressed air source 100 to terminal 10. The airflow cutoff can employ any number of known devices or methods, including, but not limited to, position sensors or mechanical triggers for detecting the position of carrier 12 in tube 14, pressure sensors, and timers.

It is to be appreciated that the pneumatic transport system of the present invention will operate in any spatial orientation. However, terminal 10 has been found to provide optimal results when carrier 12 is traveling vertically upwardly upon its arrival at terminal 10. In this way, carrier 12 is permitted to reach its equilibrium position as a result of the interaction of gravity and compressed air.

In an alternative embodiment, pneumatic pressure source 102 is connected to exhaust aperture 22 of containment chamber 18. Pneumatic pressure source 102 may be either a one-way or a two-way blower. Pressure source 102 is able to create a flow of air in direction 15 by applying a vacuum to the internal environment of containment chamber 18. If pneumatic pressure source 102 is a two-way blower, it will also create a flow of air in direction 30 by applying high pressure air to the interior of containment chamber 18. In this embodiment, retrieval door 23 provides a substantially airtight seal to retrieval aperture 21. In another alternative embodiment, both pressure source 100 and pressure source 102 are provided.

Although the present invention has been described herein with respect to specific preferred embodiments, certain modifications will be evident to those persons of ordinary skill in the art. Such modifications are intended to fall within the scope of the present invention.

We claim:

1. A carrier delivery terminal for a pneumatic transport system for transporting a carrier having a leading edge and a trailing edge, said carrier delivery terminal comprising:
    a pneumatic transport tube, said transport tube having a first end and a second end, said second end of said transport tube being closed, said transport tube defining a window aperture therethrough proximal said second end, said window aperture having a length greater than a length of said carrier and a width sufficient to permit said carrier to be passed therethrough, said window aperture having a leading edge proximal said second end of said transport tube and a trailing edge distal said second end relative to said leading edge of said window aperture;
    a stop device disposed within said transport tube between said window aperture defined through said transport tube and said second end of said transport tube, said stop device having a capacity to halt motion of said carrier from said first end to said second end of said transport tube; and
    a pneumatic pressure source connected to said transport tube, said pneumatic pressure source having a capacity sufficient to direct a stream of air through said transport tube from said first end to said second end of said transport tube, said stream exiting said transport tube through said window aperture defined through said transport tube, said stream having a capacity sufficient to force said trailing edge of said carrier partially out of said transport tube through said window aperture defined through said transport tube and said stream having a capacity sufficient to force said trailing edge of said carrier into engagement with said trailing edge of said window aperture defined through said transport tube.

2. The carrier delivery terminal for a pneumatic transport system of claim 1 wherein said pneumatic pressure source is a two-way blower, said pneumatic pressure source having a capacity to alternatively create airflow from said first end to said second end or from said second end to said first end of said transport tube in order to effect movement of said carrier through said transport tube.

3. The carrier delivery terminal for a pneumatic transport system of claim 1 further comprising a containment chamber surrounding said second end of said transport tube, said stop device, and said window aperture defined through said transport tube, said containment chamber defining a carrier access aperture and an exhaust aperture therethrough, said containment chamber having a door mounted thereon whereby said carrier access aperture is closed when said door is in a closed position, and whereby said stream flowing through said window aperture from said transport tube is exhausted from said containment chamber through said exhaust aperture.

4. The carrier delivery terminal for a pneumatic transport system of claim 3 further comprising a second pneumatic pressure source, said second pneumatic pressure source being connected to said exhaust aperture formed through said containment chamber whereby air within said containment chamber is evacuated by said second pneumatic pressure source.

5. The carrier delivery terminal for a pneumatic transport system of claim 1 wherein said stop device comprises an air cushion zone, said air cushion zone comprising a section of said transport tube disposed between said second end of said transport tube and said window aperture defined through said transport tube, said air cushion zone having an axial dimension at least one and one-half times said length of said carrier.

6. A carrier delivery terminal for a pneumatic transport system for transporting a carrier having a leading edge and a trailing edge, said carrier delivery terminal comprising:
- a pneumatic transport tube, said transport tube having a first end and a second end, said second end of said transport tube being closed, said transport tube defining a window aperture therethrough proximal said second end, said window aperture having a length greater than a length of said carrier and having a width sufficient to permit said carrier to be passed through said window aperture, said window aperture having a leading edge proximal said second end of said transport tube and a trailing edge distal said second end relative to said leading edge of said window aperture;
- an air cushion zone defined by said transport tube between said second end and said window aperture, said air cushion zone having an axial dimension sufficient to stop motion of said carrier from said first end of said transport tube to said second end of said transport tube; and
- a pneumatic pressure source connected to said transport tube, said pneumatic pressure source having a capacity sufficient to direct a stream of air through said transport tube from said first end to said second end of said transport tube, said stream exiting said transport tube through said window aperture defined through said transport tube, said stream having a capacity sufficient to force a portion of said trailing edge of said carrier partially out of said transport tube through said window aperture defined through said transport tube and said stream having a capacity sufficient to force said trailing edge of said carrier into engagement with said trailing edge of said window aperture defined by said transport tube.

7. The carrier delivery terminal for a pneumatic transport system of claim 6 further comprising an airflow cutoff whereby said airflow cutoff is able to disengage said pneumatic pressure source at a predetermined time.

8. The carrier delivery terminal for a pneumatic transport system of claim 7 wherein said pneumatic pressure source is a two-way blower whereby said pneumatic pressure source can alternatively create a flow of air from said first end to said second end and from said second end to said first end of said pneumatic transport tube.

9. A carrier delivery terminal for a pneumatic transport system for transporting a carrier having a leading edge and a trailing edge, said carrier delivery terminal comprising:
- a pneumatic transport tube, said transport tube having a first end and a second end, said second end of said pneumatic transport tube being closed, said pneumatic transport tube defining a window aperture therethrough proximal said second end, said window aperture defined through said pneumatic transport tube having a length greater than a length of said carrier and a width sufficient to permit said carrier to be passed therethrough, said window aperture having a leading edge proximal said second end of said transport tube and a trailing edge distal said second end of said transport tube relative to said leading edge of said window aperture, said trailing edge of said window aperture being constructed to engage said trailing edge of said carrier in order to retain said carrier in a position for delivery to a terminal operator;
- a stop device disposed within said transport tube between said window aperture formed through said transport tube and said second end of said transport tube whereby motion of said carrier from said first end to said second end of said transport tube is halted by said stop device;
- a pneumatic pressure source connected to said transport tube, said pneumatic pressure source having a capacity sufficient to direct a stream of air through said transport tube from said first end to said second end of said transport tube, said stream exiting said transport tube through said window aperture defined through said transport tube, said stream having a capacity sufficient to force a portion of said trailing edge of said carrier partially out of said transport tube and into engagement with said trailing edge of said window aperture defined through said transport tube; and
- a containment chamber surrounding said second end of said transport tube, said stop device, and said window aperture defined through said transport tube, said containment chamber defining a carrier access port and an exhaust port therethrough.

10. The carrier delivery terminal for a pneumatic transport system of claim 9 wherein said stop device comprises an air cushion zone defined by said transport tube between said second end of said transport tube and said window aperture defined through said transport tube, said air cushion zone having an axial dimension at least one and one-half times said length of said carrier.

11. A method for delivering a carrier having a leading edge and a trailing edge to a user upon arrival of said carrier at a second end of a pneumatic transport system, said method comprising the steps of:
- providing a transport tube having a window aperture defined therethrough, said window aperture having a leading edge proximal said second end of said pneumatic transport system and a trailing edge distal said second end of said pneumatic transport system relative to said leading edge of said window aperture, said window aperture having a length greater than a length of said carrier and having a width sufficient to permit said carrier to pass through said window aperture;
- directing a stream of air from first end to said second end of said pneumatic transport system, said stream exiting said transport tube through said window aperture defined through said transport tube, said stream having a capacity sufficient to move said carrier from said first end to said second end of said pneumatic transport system;
- forcing said trailing edge of said carrier partially out of said transport tube through said window aperture using said stream flowing through said window aperture; and
- causing said trailing edge of said carrier to rest on said trailing edge of said window aperture using said stream flowing through said window aperture whereby said carrier can be retrieved readily from said pneumatic transport system.

* * * * *